United States Patent [19]

Winchell et al.

[11] E Re. 31,135

[45] Reissued Feb. 1, 1983

[54] FLEXIBLE COLLAPSIBLE CONTAINERS, AND METHOD OF MOLDING

[75] Inventors: David A. Winchell, Twin Lakes, Wis.; Jerry D. Martin, Cary, Ill.; Frank L. Roe, Brookfield Center, Conn.

[73] Assignee: Baxter Travenol Laboratories, Inc., Deerfield, Ill.

[21] Appl. No.: 354,416

[22] Filed: Mar. 3, 1982

Related U.S. Patent Documents

Reissue of:

[64] Patent No.: 4,191,231
Issued: Mar. 4, 1980
Appl. No.: 817,940
Filed: Jul. 22, 1977

[51] Int. Cl.[3] ..... B65D 35/08

[52] U.S. Cl. ..... 150/8; 150/1; 128/272; 128/DIG. 24

[58] Field of Search ..... 150/8, 1, 0.5; 128/272, 128/DIG. 24, 272.3, 214 D, 214 B, 214 C; 141/114

[56] References Cited

U.S. PATENT DOCUMENTS

| | | | |
|---|---|---|---|
| 3,211,144 | 10/1965 | Nehring | 150/1 |
| 3,215,299 | 11/1965 | Coanda et al. | 150/8 |
| 3,519,158 | 7/1970 | Anderson | 150/1 |
| 3,537,498 | 11/1970 | Amand | 150/0.5 |
| 3,788,369 | 1/1974 | Killinger | 128/272.3 |
| 3,788,374 | 1/1974 | Saijo | 150/8 |
| 3,911,918 | 10/1975 | Turner | 128/272 |

*Primary Examiner*—Joseph Man-Fu Moy
*Attorney, Agent, or Firm*—Garrettson Ellis; John P. Kirby, Jr.; Bradford R. L. Price

[57] ABSTRACT

The method of molding flexible, collapsible containers comprises extruding a tubular parison of material to be molded and sealing the outer, free end of the parison; ballooning the parison with relatively low pneumatic pressure; closing the mold about the ballooned parison to cause the edges of the parison to protrude out of the mold chamber; and sealing said parison to form said container, including the step of forming seal lines positioned laterally inwardly from the lateral edges of the parison. A novel container design is also covered.

5 Claims, 9 Drawing Figures

FLEXIBLE COLLAPSIBLE CONTAINERS, AND METHOD OF MOLDING

Matter enclosed in heavy brackets [ ] appears in the original patent but forms no part of this reissue specification; matter printed in italics indicates the additions made by reissue.

BACKGROUND OF THE INVENTION

Blood is generally stored in flexible, collapsible containers. The soft, collapsible, plastic material of the containers permits the blood to be drained from the containers without bringing it into contact with vented air in the container.

Various plastic formulations exhibit good characteristics of compatibility with blood cells. At the present time, most blood bags are made of polyvinyl chloride formulations, for one reason because of good Radio Frequency (R.F.) sealing characteristics.

Other plastics are also promising candidates for collapsible blood bag materials, for example, various copolymers of polyolefins, such as those containing ethylene, propylene, and/or butylene units, and copolymers containing other units such as styrene and vinyl acetate.

Unfortunately, many vinylic polymer materials such as polyolefins are less susceptible to R.F. sealing. Thus, they are not as readily manufacturable by the peripheral heat sealing of plastic sheets together to define the container in the manner analogous to the present manufacturing process of vinyl blood bags, particularly when the most desirable thin-walled blood bags are being manufactured, in which the wall thickness is as low as 0.008 to 0.018 inch, for example. In this case, conventional assembly methods for blood bags have been found not to produce a container of adequate strength with, for example, polyolefin-based polymers having this low wall thickness.

Also, blood bags are usually of a generally oval cross section in which the major axis of the oval is substantially larger than the minor axis, e.g. at least 50 percent greater and preferably at least 100 percent greater.

Another alternative for manufacture of polyolefin-containing containers and the like is blow molding, in which a tubular parison is extruded, placed into a blow mold, and then inflated, to conform to the shape of the inner chamber of the mold. However, it has proven difficult to blow mold containers of extreme oval cross section without obtaining substantial differences in the wall thickness about the circumference of the cross section. This, in turn, interferes severely with the desired mode of collapsing of the container.

In accordance with this invention, novel oval containers are disclosed, having wall thicknesses about their cross section of improved uniformity, as well as other advantages described below. These containers can be made so that the container walls are sufficiently thin to be readily collapsible in the manner of conventional blood bags, although the use of the container is not restricted merely to blood bags, but they may be used for any of a large variety of desired uses for collapsible bags.

DESCRIPTION OF THE INVENTION

In this invention, flexible, collapsible containers, preferably of the novel type described below, are made by extruding a tubular parison of material to be molded, and sealing the outer end of the parison; ballooning the parison with relatively low pneumatic pressure (for example 5 to 10 p.s.i.g.), closing the mold about said ballooned parison to cause lateral edges of the ballooned parison to protrude out of the mold chamber of said mold, and sealing said parison to form the flexible, collapsible container, including forming seal lines for the container, by means of the mold, positioned laterally inwardly from the lateral edges of the parison.

Preferably, the entire bag is defined by seal lines interior from the edges of the parison. Thus, the formed bag is surrounded by what might be called a frame of parison material, which may be stripped off after formation of the bag.

The invention of this application is easily utilizable to produce containers of generally oval cross sections, in which the major axes of the cross sections are at least fifty percent greater than the minor axes of the cross sections. This is so because the closing mold chamber, which will be of corresponding shape, simply presses the parison together to permit the molding of the container out of a pair of parison face sections, which are generally surrounded by other portions of the parison for later removal.

The method of this application is preferably utilized on a container which is formed in the mold without axial stretching, to avoid an excessive amount of bi-axial orientation, which may interfere with the formation of strong, peripheral seal lines defining the container formed out of the parison.

As a further advantage, this invention can be performed with reduced tolerances relative to parison size and positioning with respect to the mold, when compared with many other blow molding techniques, especially those involved with the blow molding of thin-walled containers of highly oval cross section. Accordingly, the containers produced in the manufacturing process can be expected to exhibit fewer rejects, even though less expensive and precise apparatus is used in the manufacture.

Preferably, when the mold is closed about the parison, relatively high pneumatic pressure when compared with the relatively low pneumatic pressure (for example 50 to 120 p.s.i.g.) utilized to initially balloon the parison, is applied to the parison interior through access apertures which the mold defines in the container, to blow mold it into intimate conformity with the shape of the mold chamber.

It is also preferred to extrude the parison to exhibit an increase in wall thickness over a relatively minor part of its length, to provide a substantially increased wall thickness in that portion of the parison which is to be molded to define the access apertures, when compared with the majority of the remainder of the parison. Accordingly, relatively rigid access apertures may be defined in one end of the container, while the remainder of the container is thin, flexible and collapsible.

It is also preferred for the collapsible container to be shaped by the mold so that circumferences of the container wall sections in planes perpendicular to the longitudinal axis of the chamber are essentially all oval and uniform, the portions adjacent both ends of the chamber tapering transversely to thin ends, and correspondingly increasing in lateral dimension to achieve the uniform circumference of the chamber wall sections.

Accordingly, by the method described above, flexible, collapsible bags for blood and other desired uses, having a substantially oval cross section, may be mass produced on a reliable basis, even when made from polyolefin-based materials which do not seal well by conventional R.F. sealing. This also permits the use of plastics in blood bags having greatly reduced plasticizer content, which is deemed by many to be desirable.

Figure 1:
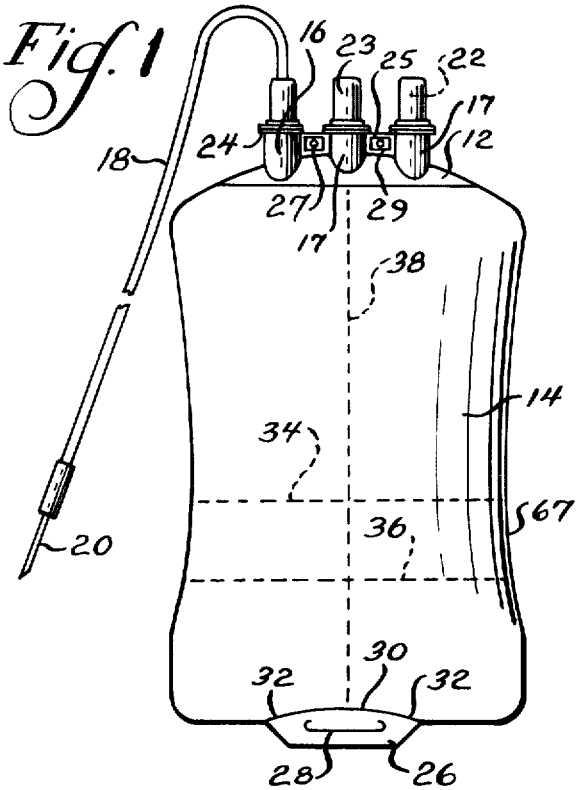
FIG. 1 is an elevational view of a blood bag which is manufactured in accordance with this invention.

Referring to the drawings, blood bag 10 is illustrated defining a closed, flexible, collapsible container of generally oval cross section having a shoulder portion 12 with a wall thickness substantially thicker than the wall thickness of the remainder 14 of the sealed collapsible portion. Specifically, shoulder portion 12 may be from 0.02 to 0.1 inch thick, typically 0.06 inch, while the remaining portion 14 of bag 10 may range from 0.008 to 0.018 inch, for example 0.013 inch, with relatively little variation in wall thickness in different portions 14 of the container.

There is defined through shoulder portion 12 a plurality of spaced, upstanding tubular sleeves 16, 17 projecting outwardly from the end of the bag to provide communication to the bag interior. Sleeve 16, as shown, is connected to a donor tubing 18, which terminates in a conventional needle assembly 20, being connected to sleeve 16 in the manner shown in the co-pending patent application of David A. Winchell, et al., Ser. No. 705,319 filed July 14, 1976. The other sleeves 17 carry molded tubular structures 22, being heat sealed to the outer ends 24 of sleeves 17. The sleeves 17 define a sealing diaphragm across their bores which may be penetrated by a sterile needle for access.

Outside of structure 22 a closed port protector 23 is provided. Tubular structure 22 and port protector 23 may be of conventional structure. Structure 22, donor tubing 18, and protectors 23 may be added after molding of the bag 10.

Sleeves 16, 17 may be interconnected by thin web portions 25 integral with the sleeves. Web member 25 has a perforatable portion 27 defined therein, being perforatable because of the presence of the line of weakness 29 designed in the web member 25, the line of weakness being only about 0.001 or 0.002 inch thick and defining a closed, generally rectangular (or circular if desired) figure so that web member 27 may be punched out to permit the passage therethrough of alignment rods of a plasma extractor or other hanging and orienting members.

At the other end of container of bag 10 an integrally attached, flat tail seal and hanger portion 26 is provided, being defined with a perforatable slot 28, to permit penetration of a hanger rod or hook so that the bag may be hung in inverted position.

Hanger member 26 is shown to be longitudinally recessed toward the container 10 at its central portion 30 relative to the lateral portions 32 thereof. This permits the tucking of the hanger portion into the bulk of the bag during the configuration of the blood bag after collection of the blood has taken place.

It might also be added that, as an alternative embodiment to the bag specifically illustrated herein, different numbers of ports 16 may be provided. For example, a fourth port may be provided for permanent communication with tubing connecting to a second blood bag, for providing a double bag similar in function to the presently known double bags. Also, in similar manner, the bag of this invention may be utilized in conjunction with other multiple bag systems.

Figure 2:
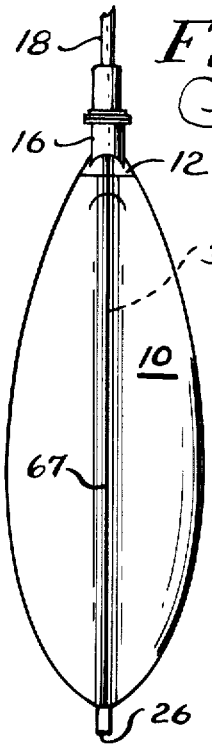
FIG. 2 is a side elevational view of the blood bag of FIG. 1, rotated 90 degrees from the view of FIG. 1 about the longitudinal axis thereof, with the blood donor tube broken away.

It may be seen from an inspection of FIGS. 1 and 2 that the circumferences of the container wall section, for example sections 34 and 36, which are perpendicular to the longitudinal axis 38 of the chamber, are essentially all uniform except at the extreme ends of the container. This is accomplished by the fact that both ends of the chamber taper transversely to thin ends as illustrated in FIG. 2 while correspondingly increasing in lateral dimension as illustrated in FIG. 1, to achieve the generally uniform circumference of the chamber wall sections 34, 36 etc. throughout the great majority of this invention, despite the changing transverse and lateral dimensions as illustrated in FIGS. 1 and 2. This arrangement facilitates the flat collapse of the container despite the fact that it has been molded in oval shape, as further disclosed for example in Canadian Pat. No. 1,001,511.

The collapsible, uniform-walled, blow molded container of this invention may be manufactured in accordance with the following process steps, as illustrated in FIGS. 3 through 9. The apparatus used for performing the method of this invention may, for example, be a continuous extrusion machine with a secondary blow station, for example of the type manufactured by Bekum Maschinenfabriken Gmbh, of Berlin. This machine may be modified with a special attachment for prepinching the parison as illustrated.

Figure 3:
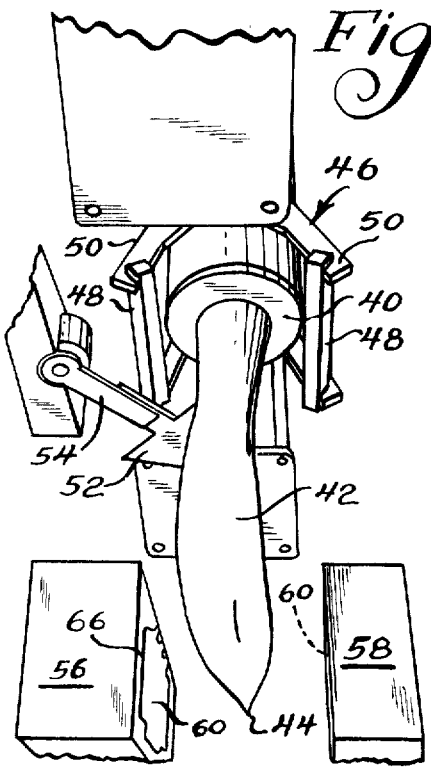
FIGS. 3 through 8 are perspective views of portions of a molding machine, showing sequential steps in the molding operation of this invention.

Turning to FIG. 3, extruder 40 is shown in the process of extruding a hot, tubular plastic parison 42 which has been sealed at its outer end 44 by pinching unit 48. Pinching unit 46 is shown to comprise a pair of sealing bars 48 positioned upon reciprocating arms 50 so that, in the manner programmed, they are opened as shown to allow the parison 42 to lass, and then intermittently close together to provide a transverse seal 44 at the outer end of the parison.

FIG. 3 also shows cutting blade 52 positioned on horizontally swinging arm 54, which swings through the parison 42 to cut it at the appropriate time.

Mold halves 56, 58 each defining a mold chamber 60 of a shape complementary to the shape of half of bag 10, is also shown in FIG. 3.

After parison 42 has lowered between mold halves 56, 58, the tubular extruded parison is exposed in its interior to a low pressure (about 8 p.s.i.g.) to cause it to balloon outwardly as shown in FIG. 3 until its transverse dimension approximates the width of mold chambers 60. The portion of the parison that defines shoulders 12 may be extruded with a thicker wall.

Figure 4:
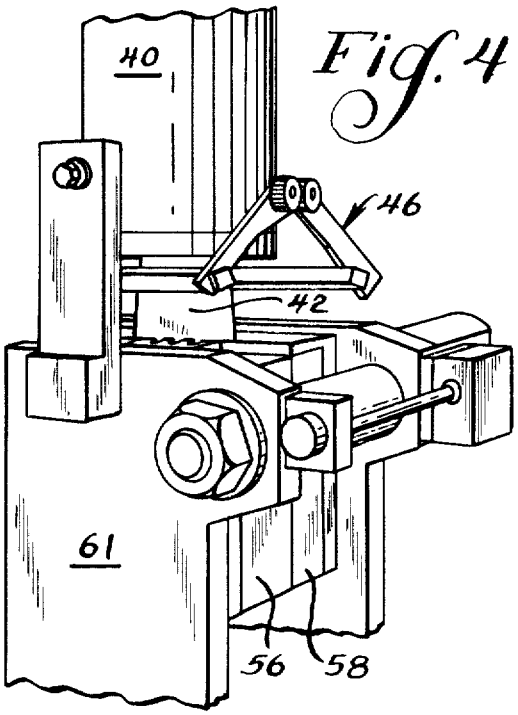

Then, the mold halves 56, 58 are closed, as shown in FIG. 4, to cause the parison to be transversely collapsed to assume the general shape of chambers 60. However, parison 42 has been ballooned so that it exceeds the transverse dimension of the mold chamber 60, and thus overlaps it generally on all sides thereof, as illustrated in the elevational view of FIG. 9.

Figure 5:
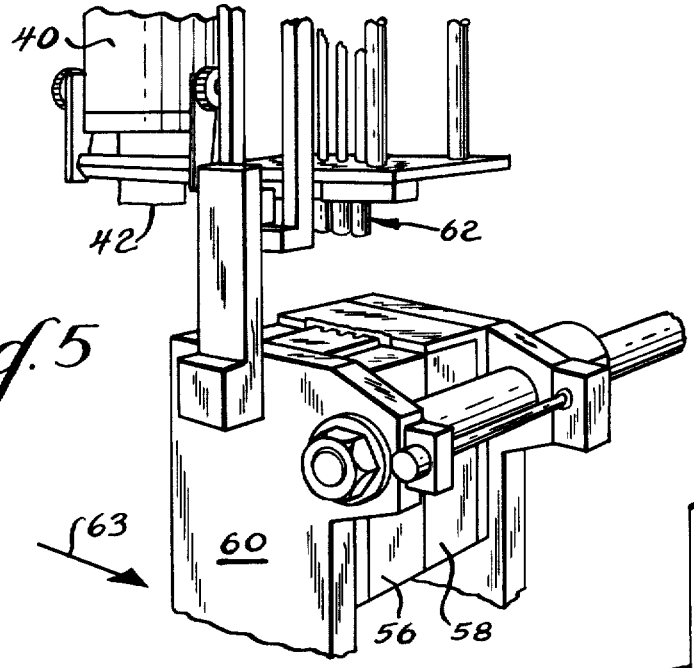

The sealing edges 66 of mold chamber 60 may be approximately 0.015 to 0.05 inch wider, typically 0.03 inch, being surrounded on the outside by recess 65 formed in face 68 of each mold half, to form a thinned seal line 67, defining the newly-formed bag 10, which is surrounded by a flash portion 70 of the parison. Thereafter, knife 52 cuts the parison 42, and the closed mold halves 56, 58 held within mold retainer assembly 61 are horizontally moved, as shown in FIG. 5, in the conventional manner of the Bekum machine, out from under extruder 40 to a position under blow tube assembly 62.

Figure 6:
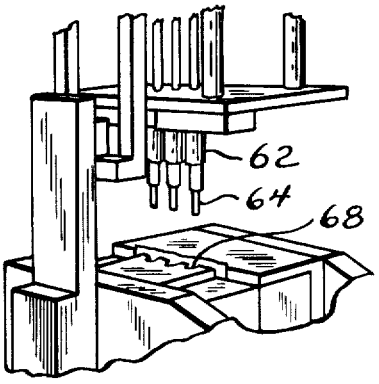
Figure 7:
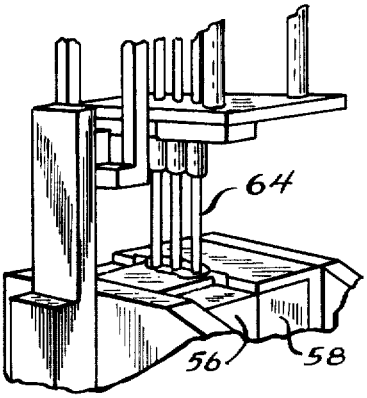
Figure 9:
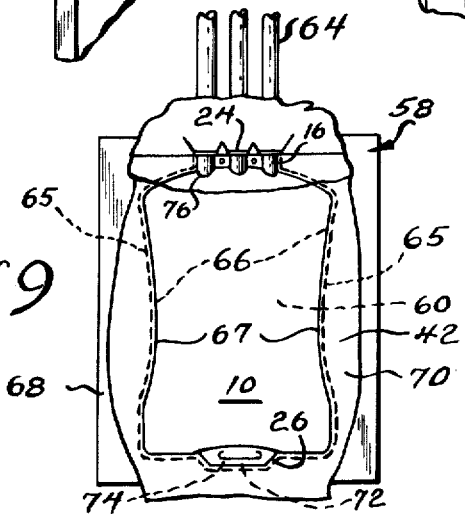
FIG. 9 is an elevational view of one mold half utilized in this invention, with the newly-formed container shown resting therein.

As shown in FIG. 6 and 7 blow tubes 64 move downwardly from assembly 62, to pass through apertures 68 defined in the mold halves, and through sleeve portions 16 defined in the newly-formed bag in the closed mold, to penetrate into the bag interior.

Tubes 64 may be proportioned to sealingly pass through the bores of sleeves 16 to assist in the formation thereof. Then relatively high pneumatic pressure (for example 90 p.s.i.g.) is applied through tubes 64 to the bag interior, to blow mold the bag to its final configuration intimately corresponding to the shape of the mold chambers 60. A perspective view of this step is shown in FIG. 7, with an opened elevational view of the same step being shown in FIG. 9.

Figure 8:
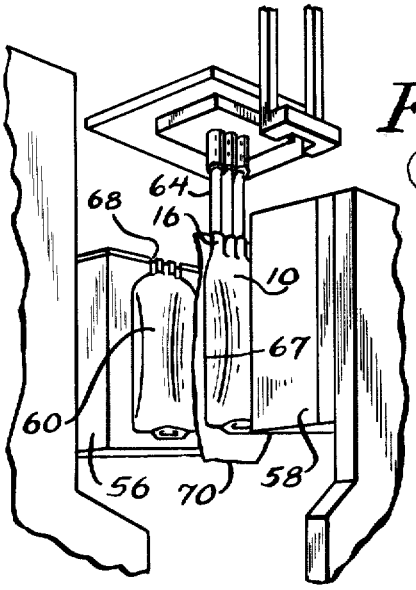

Thereafter, mold halves 56 reopen as shown in FIG. 8, and newly-formed bag 10 drops out of the apparatus. Thereafter, the flash portions 70 of the parison which are outside of thin seal line 67, formed by mold chamber edges 66, may be stripped off, and the auxiliary member 22, 23, and donor tubing 18 may be added, to provide a blood bag 10 as shown in FIGS. 1 and 2.

Each mold half 56, 58 defines a tail-forming section 72 including a raised portion 74 to define the tail seal 26 and thin pierceable portion 28 of the bag. Also, each mold half defines an access tube-forming portion 76 comprising a complementary shaped area for forming the sleeve 16 and web member 25, as well as perforatable portion 27. Raised linear portions on the mold define thin, frangible portions 29.

The above has been offered for illustrative purposes only, and is not for the purpose of limiting the invention of this application, which is as defined in the claims below.

That which is claimed is:

1. A blow-molded, flexible, collapsible container, free of laterally positioned longitudinal seal [lines] *flaps*, which defines a sealed, collapsible portion of generally oval transverse cross-section and, defined at one end of said sealed portion, a shoulder portion having a wall thickness substantially thicker than the wall thickness of the sealed, collapsible portion, a plurality of spaced, upstanding sleeves being defined through said shoulder portion at said one end, the oval cross-sections of said sealed, collapsible portion defining major axes which are at least 50 percent greater than the minor axes of said oval cross-sections to facilitate flat collapse, and at the end of said container opposite to said shoulder portion end an integrally-attached, flat tail seal and hanger portion, said tail seal and hanger portion defining a continuous inner end integral with the remainder of said container material and having central and lateral portions, said continuous inner end being longitudinally recessed toward said container at its central portion relative to the lateral portions thereof to permit tucking of the hanger portion into the bag.

2. The flexible, collapsible container of claim 1 including a web portion connecting said spaced sleeves, and perforatable portions defined in said web portion to permit the passage therethrough of alignment rods of a plasma extractor.

3. The container of claim 1 in which the circumferences of container wall sections in planes perpendicular to the longitudinal axis of said chamber are essentially all uniform, the portions adjacent both ends of the chamber tapering transversely to thin ends, and correspondingly increasing in lateral dimension to achieve the uniform circumference of said chamber wall sections.

4. The container of claim 3 in which, apart from the area of said shoulder portions, the wall thickness of said container is generally uniform.

5. The container of claim 4 in which the plastic of the container does not exhibit longitudinal axial orientation.

* * * * *